United States Patent
Akamine et al.

(10) Patent No.: US 8,932,982 B2
(45) Date of Patent: Jan. 13, 2015

(54) EXHAUST GAS PURIFICATION CATALYST

(75) Inventors: Masaaki Akamine, Hiroshima (JP); Masahiko Shigetsu, Higashi-Hiroshima (JP); Yasuhiro Ochi, Hiroshima (JP); Yuki Murakami, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 903 days.

(21) Appl. No.: 13/115,890

(22) Filed: May 25, 2011

(65) Prior Publication Data

US 2011/0301025 A1 Dec. 8, 2011

(30) Foreign Application Priority Data

Jun. 7, 2010 (JP) .................. 2010-130169

(51) Int. Cl.
*B01J 23/10* (2006.01)
*B01J 35/00* (2006.01)
*B01J 23/63* (2006.01)
*B01J 37/03* (2006.01)
*B01J 35/02* (2006.01)
*B01J 37/02* (2006.01)
*B01D 53/94* (2006.01)

(52) U.S. Cl.
CPC .............. *B01J 35/0006* (2013.01); *B01J 23/63* (2013.01); *B01J 37/031* (2013.01); *B01J 35/023* (2013.01); *B01J 37/0215* (2013.01); *B01D 53/9422* (2013.01); *B01D 53/944* (2013.01); *B01D 53/945* (2013.01); *B01D 2255/20715* (2013.01); *B01D 2255/2092* (2013.01); *B01D 2255/407* (2013.01); *B01D 2258/012* (2013.01); *B01D 2258/014* (2013.01); *Y02T 10/22* (2013.01); *B01J 2523/00* (2013.01)
USPC ............ 502/304; 502/303; 502/349; 502/355

(58) Field of Classification Search
USPC .................. 502/303, 304, 349, 355
See application file for complete search history.

(56) References Cited

U.S. PATENT DOCUMENTS

| 7,341,975 | B2 | 3/2008 | Iwakuni et al. |
| 2005/0070428 | A1 | 3/2005 | Kawamoto et al. |
| 2006/0276331 | A1 | 12/2006 | Akamine et al. |
| 2008/0269046 | A1 | 10/2008 | Minoshima et al. |
| 2009/0298673 | A1 | 12/2009 | Akamine et al. |
| 2011/0045968 | A1 | 2/2011 | Akamine et al. |

FOREIGN PATENT DOCUMENTS

| CN | 1872411 A | 12/2006 |
| CN | 101293203 A | 10/2008 |
| JP | 2004-174490 A | 6/2004 |
| JP | 2006-297260 A | 11/2006 |
| JP | 2006-334490 A | 12/2006 |
| JP | 2009-028575 A | 2/2009 |
| JP | 2009-285622 A | 12/2009 |
| JP | 2009-287528 A | 12/2009 |

*Primary Examiner* — Kaj K Olsen
*Assistant Examiner* — Pritesh Darji
(74) *Attorney, Agent, or Firm* — Studebaker & Brackett PC

(57) ABSTRACT

An exhaust gas purification catalyst includes a catalytic layer containing a particle component A-1 and a particle component A-2 with different catalytic metal contents, each of which is composed of catalytic-metal-doped CeZr-based mixed oxide powder. The particle component A-1 having the lower catalytic metal content is supported on a particle component B composed of Zr-based-oxide-supported alumina powder, and the particle component A-2 having the higher catalytic metal content is supported on a particle component C composed of CeZr-based mixed oxide powder in which catalytic metal is not solid-dissolved.

15 Claims, 3 Drawing Sheets

EXHAUST GAS PURIFICATION CATALYST

CROSS-REFERENCE TO RELATED APPLICATION

This application claims priority to Japanese Patent Application No. 2010-130169 filed on Jun. 7, 2010, the disclosure of which including the specification, the drawings, and the claims is hereby incorporated by reference in its entirety.

BACKGROUND

The present disclosure relates to an exhaust gas purification catalyst.

The exhaust gas purification catalyst (three-way catalyst) purifying HC (hydrocarbon), CO (carbon monoxide), and NOx (nitrogen oxide) in engine exhaust gas generally contains, e.g., activated alumina and Ce-containing oxide in addition to catalytic metal such as Pt, Pd, and Rh. Since the activated alumina has high heat resistance and a large specific surface area, the activated alumina has been conventionally used as a support of the catalytic metal, and can maintain a state in which the catalytic metal is supported so as to be relatively highly dispersed even if the catalyst is exposed to high-temperature exhaust gas. The Ce-containing oxide stores and releases oxygen depending on fluctuation in oxygen concentration of exhaust gas, and therefore has been used as an oxygen storing/releasing material expanding an A/F window (an air-fuel ratio range in which the catalyst can simultaneously purify HC, CO, and NOx).

CeZr-based mixed oxide containing Ce and Zr has been known as the Ce-containing oxide. The CeZr-based mixed oxide has higher heat resistance as compared to that of ceria. In addition, since Zr dissolution causes crystal strain and an increase in an oxygen defect, an oxygen storing/releasing capacity comparable to that of ceria is provided. Further, CeZr-based mixed oxide has been known, in which rare-earth metal such as Nd, Y, and La is solid-dissolved.

The CeZr-based mixed oxide having a particle size (diameter) of about 1 μm has been generally used for the catalyst. The catalytic metal is physically supported on surfaces of CeZr-based mixed oxide particles by, e.g., evaporation to dryness or impregnation, thereby increasing an oxygen storing/releasing amount. This is because the catalytic metal is a medium accelerating the storage/release of oxygen by the CeZr-based mixed oxide. In such a case, the oxygen storing/releasing amount of the CeZr-based mixed oxide is also significantly low as compared to a theoretical value. This is because only surface portions of the particles having the particle size of about 1 μm are used for the oxygen storage.

As an oxygen storing/releasing material for which the foregoing point is improved, catalytic-metal-doped CeZr-based mixed oxide has been known, in which catalytic metal is solid-dissolved in CeZr-based mixed oxide (see Japanese Patent Publication No. 2004-174490). The term "doped" means that the catalytic metal is solid-dissolved in the mixed oxide, and is placed at crystal lattice points of the mixed oxide or between atoms of the mixed oxide. In the catalytic-metal-doped CeZr-based mixed oxide, the oxygen storing/releasing amount and an oxygen storing/releasing speed are dramatically improved as compared to those of CeZr-based mixed oxide which is not doped with the catalytic metal. This is because some of the catalytic metal particles are inside a mixed oxide particle, and accelerate movement of oxygen atoms inside the mixed oxide particle. That is, this is because not only the surface portion of the particle but also the inside of the particle are used for the storage/release of oxygen.

According to the catalytic-metal-doped mixed oxide, there are advantages that not only oxygen storing/releasing performance is improved, but also a catalytic metal amount of the catalyst can be significantly reduced. The catalytic-metal-doped CeZr-based mixed oxide is not limited to the use for the three-way catalyst, but can be used for, e.g., a lean NOx catalyst purifying NOx exhausted from a lean-combustion gasoline engine, and a PM (particulate matter) combustion catalyst efficiently oxidizing and combusting PMs trapped by a diesel particulate filter.

However, in the catalytic-metal-doped CeZr-based mixed oxide particles, all of the catalytic metal particles are not present on the particle surfaces, and a part of the catalytic metal particles is merely exposed on the particle surfaces. Thus, it is less likely that the catalytic metal and exhaust gas contact each other, and improvement of exhaust gas purification performance by doping the catalytic metal is limited.

On the other hand, the applicant of the present disclosure has proposed one solution in Japanese Patent Publication No. 2006-334490. In such a solution, the applicant has proposed that, on surfaces of first mixed oxide (CeZr-based mixed oxide) particles which are not doped with catalytic metal, second catalytic-metal-doped mixed oxide (CeZr-based mixed oxide) particles having a particle size smaller than that of the first mixed oxide particle are supported. According to such a catalytic particle, a catalytic metal concentration on a catalytic particle surface is higher than that inside the catalytic particle, and therefore relatively high catalytic activity can be achieved even with a small catalytic metal amount.

SUMMARY

The present disclosure relates to an exhaust gas purification catalyst using the catalytic-metal-doped CeZr-based mixed oxide, and it is an objective of the present disclosure to enhance exhaust gas purification performance and reduce degradation of catalytic activity at high temperature.

In order to solve the foregoing problem, in the present disclosure, two types of catalytic-metal-doped CeZr-based mixed oxide with different catalytic metal contents are used, and are supported on different supports.

That is, an exhaust gas purification catalyst disclosed herein includes a catalytic layer containing a particle component A composed of catalytic-metal-doped CeZr-based mixed oxide powder in which catalytic metal is solid-dissolved in CeZr-based mixed oxide, a particle component B composed of Zr-based-oxide-supported alumina powder in which Zr-based oxide is supported on activated alumina particles, and a particle component C composed of CeZr-based mixed oxide powder in which catalytic metal is not solid-dissolved. The particle component A includes a particle component A-1 and a particle component A-2 which have different contents of catalytic metal in the catalytic-metal-doped CeZr-based mixed oxide, at least a part of the particle component A-1 is supported on the particle component B, and at least a part of the particle component A-2 is supported on the particle component C. The content of catalytic metal is lower in the particle component A-1 than the particle component A-2.

According to such a configuration, the particle component A-1 (catalytic-metal-doped CeZr-based mixed oxide powder) supported on the particle component B (Zr-based-oxide-supported alumina powder) and having the lower content of catalytic metal, and the particle component A-2 (catalytic-metal-doped CeZr-based mixed oxide powder) supported on the particle component C (CeZr-based mixed oxide powder in which the catalytic metal is not solid-dissolved) and having the higher content of catalytic metal are combined together, thereby obtaining excellent exhaust gas purification performance.

It is preferable that the content of catalytic metal is equal to or greater than about 0.05% by mass and equal to or less than about 0.3% by mass for the particle component A-1, and is equal to or greater than about 0.4% by mass and equal to or less than about 1.0% by mass for the particle component A-2.

In a preferable embodiment, the particle component A (the particle component A-1 and the particle component A-2) has a particle size distribution with a peak in a particle size range which is equal to or greater than 100 nm and equal to or less than 300 nm. A number-average particle size of the particle component B is equal to or greater than 10 μm and equal to or less than 50 μm, and a number-average particle size of the particle component C is equal to or greater than 0.5 μm and equal to or less than 5.0 μm.

The particle component A having the particle size distribution with the peak in the particle size range which is equal to or greater than 100 nm and equal to or less than 300 nm means that the particle size of the particle component A is extremely small, i.e., a specific surface area of the particle component A is large. Thus, the particle component A has excellent oxygen storing/releasing performance as compared to that of a conventional particle component having a particle size of about 1 μm. In addition, the small particle size means a large amount of catalytic metal exposed on particle surfaces. Thus, the more excellent oxygen storing/releasing performance of the particle component A can be realized. Further, the catalytic metal is likely to contact exhaust gas, and therefore such a state is advantageous to purification of the exhaust gas.

The particle component A-1 is supported on the particle component B, and the particle component A-2 is supported on the particle component C. Thus, even if the catalyst is exposed to high-temperature exhaust gas, particles of the particle component A-1 and the particle component A-2 are less likely to be agglomerated. Consequently, degradation of the exhaust gas purification performance of the catalyst is moderated. In this regard, in catalytic particles described in Japanese Patent Publication No. 2006-334490, the catalytic-metal-doped CeZr-based mixed oxide particles are supported on the CeZr-based mixed oxide particles having a large particle size. However, unlike the catalytic-metal-doped CeZr-based mixed oxide particles described in Japanese Patent Publication No. 2006-334490, when the particle component A has the foregoing particle size distribution, such a state is more advantageous to prevention or reduction of the agglomeration of the particle component A.

That is, the catalytic particles described in Japanese Patent Publication No. 2006-334490 are obtained as follows. First mixed oxide powder is dispersed in a solution in which nitrates of Ce, Zr, and catalytic metal are dissolved. Ammonia water is added to the resultant solution, and a precursor of the catalytic-metal-doped CeZr-based mixed oxide is deposited on surfaces of the first mixed oxide particles. Subsequently, the precursor is dried and calcined. In the foregoing manufacturing method, the catalytic-metal-doped CeZr-based mixed oxide particles supported on the surfaces of the first mixed oxide particles are extremely fine particulates having a particle size of, e.g., equal to or less than tens of nanometers, resulting in an increase in surface energy. Consequently, the catalytic-metal-doped CeZr-based mixed oxide particles are agglomerated on the surfaces of the catalytic particles at high temperature, thereby degrading catalytic activity.

On the other hand, in the particle component A having the foregoing particle size distribution, surface energy of the particle component A is not excessively increased, and therefore the agglomeration of the particle component A is moderated when exposing the catalyst to high-temperature exhaust gas.

In the preferable embodiment, the catalytic layer further contains a particle component D composed of activated alumina powder containing La, and at least a part of the particle component A-1 and/or at least a part of the particle component A-2 is supported on the particle component D. Such a state is more advantageous to the improvement of the exhaust gas purification performance of the catalyst. It is preferable that a number-average particle size of the particle component D is equal to or greater than 5 μm and equal to or less than 30 μm.

It is preferable that both of the particle component A-1 and the particle component A-2 have a $CeO_2$ proportion which is equal to or greater than 30% by mass and equal to or less than 75% by mass in a total amount of $CeO_2$ and $ZrO_2$. Thus, the high exhaust gas purification performance can be realized. It is more preferable that the $CeO_2$ proportion is equal to or greater than 40% by mass and equal to or less than 60% by mass.

As described above, since the particle component A doped with the catalytic metal is supported on the particle component B, C, or D, it is not necessary that the catalytic metal is separately supported on the particle components B-D. That is, only the catalytic metal solid-dissolved in the CeZr-based mixed oxide particles of the particle component A may be contained in the catalytic layer as catalytic metal, and the high catalytic activity can be realized even if the catalytic metal is not separately supported on the particle components B-D. Thus, a catalytic metal amount can be reduced without degrading the catalytic activity of the entire catalytic layer.

In a configuration in which the particle component A has the particle size distribution with the peak in the particle size range which is equal to or greater than 100 nm and equal to or less than 300 nm, the particle component A functions as a binder configured to bind particles of other components such as the particle component B and to bind the catalytic layer to a carrier. Thus, in the preferable embodiment, the particle component A forms at least a part of the binder in the catalytic layer.

In the CeZr-based mixed oxide of the particle component A, rare-earth metal other than Ce can be solid-dissolved. Such rare-earth metal includes, e.g., Y, Nd, Pr, and La. In addition, the catalytic metal includes, e.g., Pd, Pt, Rh, In, Au, and Ag.

A structure may be employed, in which one or more catalytic layers in which catalytic metal such as Pt is supported on a support such as activated alumina are provided on the carrier in addition to the catalytic layer containing the particle components A-C or the catalytic layer containing the particle components A-D, and the one or more catalytic layers and the catalytic layer are stacked.

DETAILED DESCRIPTION

Figure 1:
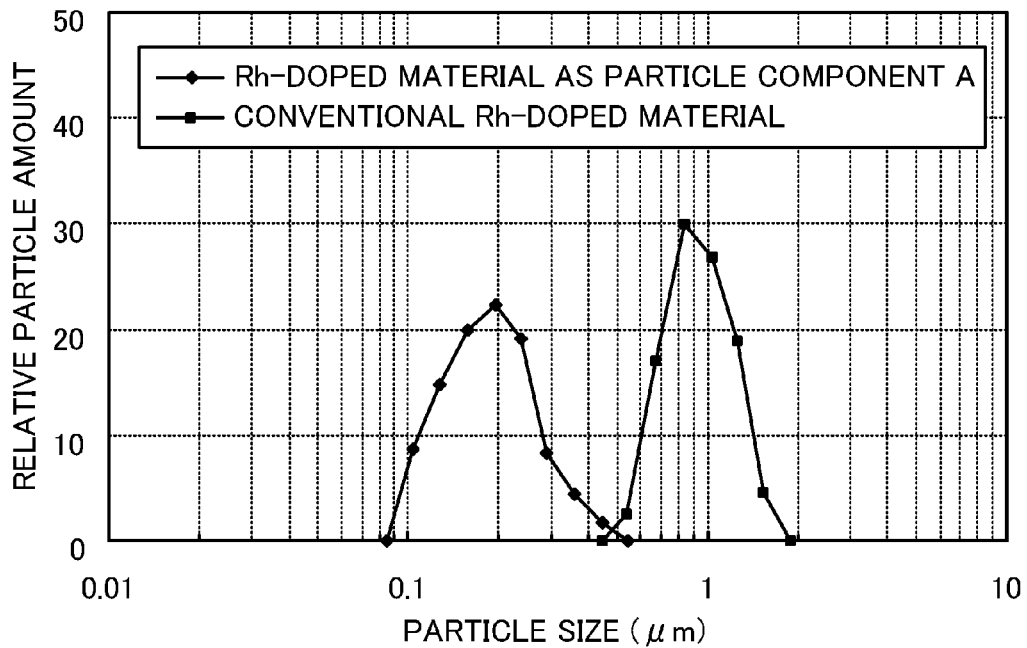
FIG. 1 is a graph illustrating a particle size distribution of Rh-doped material.

An embodiment of the present disclosure will be described below with reference to the drawings. The embodiment described below will be set forth merely for purposes of preferred examples in nature, and are not intended to limit applications or use of the invention.

An exhaust gas purification catalyst of the present embodiment is suitable for an application as a three-way catalyst simultaneously purifying HC, CO, and NOx contained in exhaust gas when a gasoline engine of an automobile is operated near a stoichiometric air-fuel ratio. In the exhaust gas purification catalyst, a catalytic layer is formed on, e.g., cell walls of a honeycomb carrier made of cordierite (a heretofore known metal carrier may be used as the honeycomb carrier). The catalytic layer contains a particle component A, a particle component B, and a particle component C, and may further contain a particle component D in some cases.

The particle component A is composed of catalytic-metal-doped CeZr-based mixed oxide powder in which catalytic metal is solid-dissolved in CeZr-based mixed oxide. The particle component B is composed of Zr-based-oxide-supported alumina powder in which Zr-based oxide is supported on activated alumina particles. The particle component C is composed of CeZr-based mixed oxide powder in which catalytic metal is not solid-dissolved. The particle component D is composed of activated alumina powder.

As the particle component A, there are two types of component, i.e., a particle component A-1 and a particle component A-2 having different catalytic metal contents in the catalytic-metal-doped CeZr-based mixed oxide, and the catalytic metal content is lower in the particle component A-1 than the particle component A-2. At least a part of the particle component A-1 having the lower catalytic metal content is supported on the particle component B, and at least a part of the particle component A-2 having the higher catalytic metal content is supported on the particle component C. In a case where the particle component D is contained in the catalytic layer, at least a part of the particle component A-1 and/or at least a part of A-2 may be supported on the particle component D.

The particle component A has a particle size distribution with a peak in a particle size range which is equal to or greater than 100 nm and equal to or less than 300 nm, and a proportion of $CeO_2$ is equal to or greater than 30% by mass and equal to or less than 75% by mass in a total amount of $CeO_2$ and $ZrO_2$ of the CeZr-based mixed oxide. A number-average particle size of the particle component B is equal to or greater than 10 μm and equal to or less than 50 μm. A number-average particle size of the particle component C is equal to or greater than 0.5 μm and equal to or less than 5.0 μm. A number-average particle size of the particle component D is equal to or greater than 5 μm and equal to or less than 30 μm.

In the catalytic layer, the particle component A functions as a catalytic component, and also functions as a binder which is interposed among particles of the particle components B-D to bind such particles, and which enters many fine recessed portions or fine holes in a surface of the carrier to reduce or prevent peeling of the catalytic layer from the carrier.

<Effect of Combination of Particle Components>

Various particle components were prepared, and an effect of a combination of the particle components on the exhaust gas purification performance was evaluated.

[Preparation of Particle Component A]

Cerium nitrate hexahydrate, a zirconyl oxynitrate solution, neodymium nitrate hexahydrate, and a rhodium nitrate solution are dissolved in ion-exchanged water. Such a nitrate solution is mixed with an 8-fold diluted solution of 28-percent-by-mass ammonia water, and is neutralized, thereby obtaining a coprecipitate. After the coprecipitate is washed by centrifugal separation, the coprecipitate is dried in air at a temperature of 150° C. all night and all day, and is crushed. Then, the crushed coprecipitate is calcined in air at a temperature of 500° for two hours. This produces conventional Rh-doped CeZr-based mixed oxide powder having a particle size distribution with a peak in a particle size range larger than the particle size range of the particle component A. Such a particle size distribution will be described later. The "Rh-doped CeZr-based mixed oxide powder" will be referred to as "Ph-doped material" below as necessary.

The particle component A (Rh-doped material having a small peak particle size) is obtained by wet crushing of the conventional Rh-doped material. That is, ion-exchanged water is added to the conventional Rh-doped material to produce slurry (a solid content of 25% by mass). Then, the slurry is injected to a ball mill, and is crushed by 0.5-mm zirconia beads (for about three hours). This produces Rh-doped CeZrNd sol in which the particle component A having particles with a reduced size is dispersed.

FIG. 1 illustrates a particle size distribution (frequency distribution) of the particle component A (Rh-doped material having the small peak particle size) and the conventional Rh-doped material having a large peak particle size. In both of the Rh-doped materials, a composition (mass ratio) of components other than Rh is $CeO_2:ZrO_2:Nd_2O_3=45:45:10$, and an Rh content is about 0.6% by mass. A laser diffraction particle size analyzer manufactured by Shimadzu Corporation is used for a measurement of the particle size distribution.

The particle component A has a peak in a particle size range which is equal to or greater than 100 nm and equal to or less than 300 nm, and the conventional Rh-doped material has a peak in a particle size range which is equal to or greater than 550 nm and equal to or less than 1200 nm. For the particle component A, a cumulative 10 mass % diameter (D10) is 107 nm in a cumulative distribution, a cumulative 50 mass % diameter (D50) is 184 nm in the cumulative distribution, and a cumulative 90 mass % diameter (D90) is 287 nm in the cumulative distribution. That is, the cumulative 10 mass % diameter (D10) is equal to or greater than 100 nm in the cumulative distribution, and the cumulative 90 mass % diameter (D90) is equal to or less than 300 nm in the cumulative distribution. For the conventional Rh-doped material, the cumulative 10 mass % diameter (D10) is 576 nm in the cumulative distribution, the cumulative 50 mass % diameter (D50) is 848 nm in the cumulative distribution, and the cumulative 90 mass % diameter (D90) is 1160 nm in the cumulative distribution. That is, the cumulative 10 mass % diameter (D10) is equal to or greater than 550 nm in the cumulative distribution, and the cumulative 90 mass % diameter (D90) is equal to or less than 1200 nm in the cumulative distribution.

By the foregoing preparation method, six types of sol of a particle component A-1 with an Rh content of 0.1% by mass, and six types of sol of a particle component A-2 with an Rh content of 0.6% by mass were prepared. The six types of sol in each of the foregoing groups are different from each other in a $CeO_2/(CeO_2+ZrO_2)$ mass ratio, and there are six levels of the mass ratio, i.e., mass ratios of 25%, 30%, 40%, 50%, 60%, and 75%. In any of the six types of sol, a composition (mass ratio) of components other than Rh is $(CeO_2+ZrO_2)$:$Nd_2O_3$=90:10.

[Combination of Particle Component A-1 and Particle Component B, C, or D]

Preparation of Catalyst A-1/B

A catalyst A-1/B is a catalyst formed by combining a particle component A-1 and a particle component B.

As the particle component B, Zr-based-oxide-supported alumina powder ($ZrLa/Al_2O_3$) having a number-average particle size of 33 μm was employed. In the $ZrLa/Al_2O_3$, ZrLa mixed oxide containing Zr and La is supported on surfaces of activated alumina particles, and the $ZrLa/Al_2O_3$ was prepared as follows. That is, activated alumina powder is dispersed in a solution mixture of zirconium nitrate and lanthanum nitrate, and ammonia water is added to the resultant mixture to produce precipitate. The produced precipitate is filtered, washed, dried at 200° C. for two hours, and calcined at 500° C. for two hours, thereby obtaining $ZrLa/Al_2O_3$. A composition (mass ratio) of the $ZrLa/Al_2O_3$ is $ZrO_2$:$La_2O_3$:$Al_2O_3$=38:2:60.

Each of the six types of sol of the particle component A-1, and the particle component B ($ZrLa/Al_2O_3$) were mixed with ion-exchanged water to produce slurry. The carrier is coated with the slurry, and drying and calcining processes were performed. Then, six types of the catalyst A-1/B (A-1 sol/($ZrLa/Al_2O_3$)) were obtained. In a catalytic layer of such a catalyst, the particle component A-1 which is a catalytic component also functions as a binder.

An amount of each supported component per a carrier capacity of 1 L is 40 g/L for the particle component A-1 and 70 g/L for the particle component B. An Rh content in the catalytic layer is 0.04 g/L (=an amount of doped Rh in the particle component A-1). As the carrier, a honeycomb carrier (a capacity of 1 L) made of cordierite was used, and had a cell wall thickness of 3.5 mil ($8.89 \times 10^{-2}$ mm) and the cell number of 600 per square inch (645.16 mm$^2$). The same carrier is employed for other catalysts which will be described later.

Preparation of Catalyst A-1/C

A catalyst A-1/C is a catalyst formed by combining a particle component A-1 and a particle component C.

As the particle component C, catalytic-metal-undoped CeZr-based mixed oxide powder (CeZrNdO) having a number-average particle size of 2.5 μm, in which catalytic metal is not solid-dissolved was employed. The CeZrNdO was prepared in the similar manner to the preparation method of the conventional Rh-doped material, except that a rhodium nitrate solution is not added to a raw material solution. A composition (mass ratio) of the CeZrNdO is $CeO_2$:$ZrO_2$:$Nd_2O_3$=23:67:10.

Then, each of the six types of the particle component A-1 (sol) and the CeZrNdO which is the particle component C were used, and six types of the catalyst A-1/C (A-1 sol/CeZrNdO) were obtained. An amount of each supported component is 40 g/L for the particle component A-1 and 70 g/L for the particle component C. An Rh content in a catalytic layer is 0.04 g/L (=an amount of doped Rh in the particle component A-1).

Preparation of Catalyst A-1/D

A catalyst A-1/D is a catalyst formed by combining a particle component A-1 and a particle component D.

As the particle component D, activated alumina powder ($La—Al_2O_3$) containing $La_2O_3$ of 4% by mass and having a number-average particle size of 13.8 μm was employed. That is, each of the six types of the particle component A-1 (sol) and the $La—Al_2O_3$ which is the particle component D were used, and six types of the catalyst A-1/D (A-1 sol/$La—Al_2O_3$) were obtained in the same manner as the preparation method of the catalyst A-1/B. An amount of each supported component is 40 g/L for the particle component A-1 and 70 g/L for the particle component D. An Rh content in a catalytic layer is 0.04 g/L (=an amount of doped Rh in the particle component A-1).

First Comparative Catalyst

A first comparative catalyst is a catalyst in which a catalytic layer is formed by supporting not a particle component A-1 having a small peak particle size but the conventional Rh-doped material having the large peak particle size on the carrier together with a zirconyl nitrate binder. Unlike the catalysts described above, particle components B, C, and D are not contained in the catalytic layer.

That is, six types of the conventional Rh-doped material with a $CeO_2/(CeO_2+ZrO_2)$ mass ratio of 25%, 30%, 40%, 50%, 60%, and 75% were prepared. In any of the materials, an Rh content is 0.1% by mass, and a composition (mass ratio) of components other than Rh is $(CeO_2+ZrO_2)$:$Nd_2O_3$=90:10. Each of the six types of the conventional Rh-doped material, and the zirconyl nitrate binder were mixed with ion-exchanged water to produce slurry. The carrier is coated with the slurry, and the drying and calcining processes were performed. Then, six types of the first comparative catalyst (conventional Rh-doped material) were obtained. A supported amount of the conventional Rh-doped material is 40 g/L, and a supported amount of the binder is 5 g/L. An Rh content in the catalytic layer is 0.04 g/L (=an amount of doped Rh in the conventional Rh-doped material).

[Exhaust Gas Purification Performance]

Bench aging was applied to each of the catalysts A-1/B, A-1/C, and A-1/D and the first comparative catalyst. In such a process, the catalyst was attached to an engine exhaust system. Then, the engine was operated while repeating a cycle including the following steps for 50 hours in total at a catalyst inlet gas temperature of 900° C.: (1) causing a flow of exhaust gas having an A/F ratio of 14 for 1 minute; (2) causing a flow of exhaust gas having an A/F ratio of 13.5 for 1 minute; and (3) causing a flow of exhaust gas having an A/F ratio of 14.7 for 2 minutes.

Figure 2:
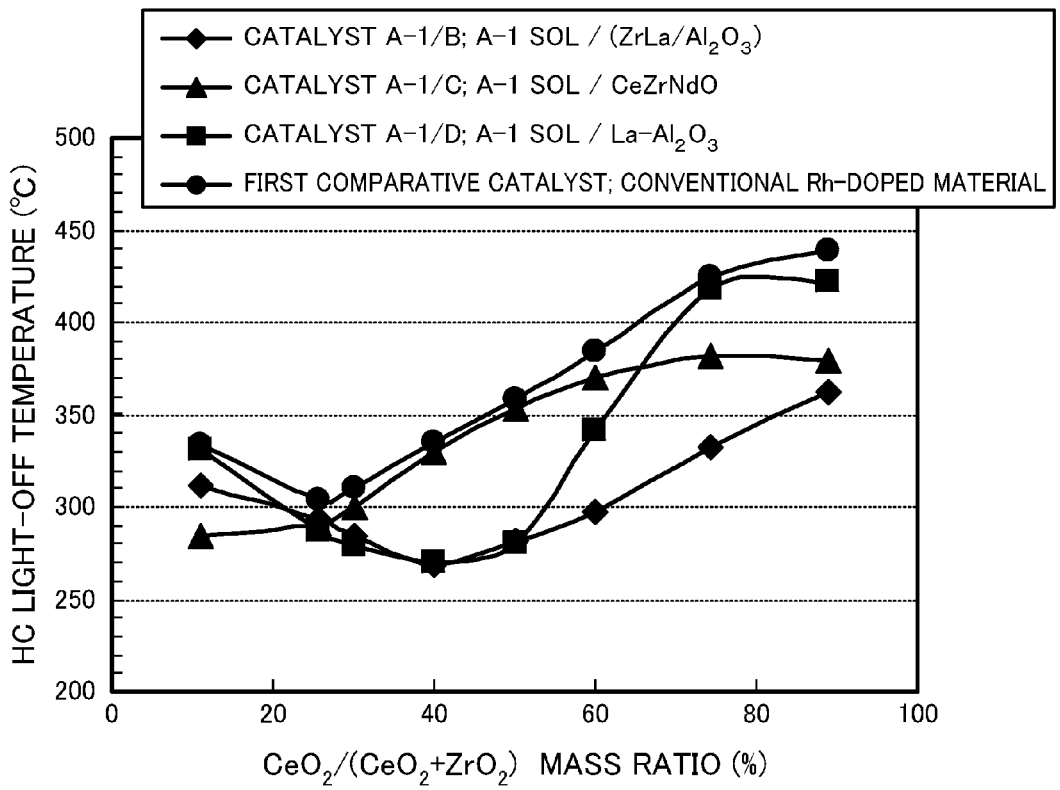
FIG. 2 is a graph illustrating a light-off temperature concerning HC purification by catalysts containing a particle component A-1 and a comparative catalyst.

Subsequently, a core sample having a carrier capacity of about 25 mL (a diameter of 25.4 mm and a length of 50 mm) was cut out from each of the catalysts, and was attached to a model gas flow reactor. Then, a light-off temperature T50 (° C.) concerning HC purification was measured. The "T50 (° C.)" is a gas temperature at an catalyst inlet when purification efficiency reaches 50% by gradually increasing a temperature of model gas flowing into the catalyst from a normal temperature. The model gas has an A/F ratio of 14.7±0.9. That is, by causing a constant flow of main stream gas having an A/F ratio of 14.7, and adding a predetermined amount of gas for changing the A/F ratio in a pulse-like manner at a period of 1 Hz, the A/F ratio was forcibly changed with an amplitude of ±0.9. A space velocity SV is 60000 h$^{-1}$, and a rate of temperature increase is 30° C./min. Table 1 shows gas compositions having A/F ratios of 14.7, 13.8, and 15.6, and FIG. 2 shows measurement results of the light-off temperature T50.

TABLE 1

| A/F | 13.8 | 14.7 | 15.6 |
|---|---|---|---|
| $C_3H_6$ (ppm) | 541 | 555 | 548 |
| CO (%) | 2.35 | 0.60 | 0.59 |

TABLE 1-continued

| A/F | 13.8 | 14.7 | 15.6 |
|---|---|---|---|
| NO (ppm) | 975 | 1000 | 980 |
| $CO_2$ (%) | 13.55 | 13.90 | 13.73 |
| $H_2$ (%) | 0.85 | 0.20 | 0.20 |
| $O_2$ (%) | 0.58 | 0.60 | 1.85 |
| $H_2O$ (%) | 10 | 10 | 10 |

According to FIG. 2, the catalyst A-1/B (A-1 sol/(ZrLa/$Al_2O_3$)) shows excellent light-off performance in a range of the $CeO_2/(CeO_2+ZrO_2)$ mass ratio, which is equal to or greater than 30% and equal to or less than 75%. In a range of the $CeO_2/(CeO_2+ZrO_2)$ mass ratio, which is equal to or greater than 30% and equal to or less than 60%, the catalyst A-1/B and the catalyst A-1/D (A-1 sol/La—$Al_2O_3$) have a light-off temperature lower than those of the catalyst A-1/C (A-1 sol/CeZrNdO) and the comparative catalyst (conventional Rh-doped material). Unlike the catalyst A-1/B and the catalyst A-1/D, the catalyst A-1/C (A-1 sol/CeZrNdO) has the poor light-off performance regardless of using the Rh-doped material having the small peak particle size.

In addition, the catalyst A-1/B, the catalyst A-1/C, and the catalyst A-1/D have a catalytic layer mass, i.e., a thermal capacity greater than that of the first comparative catalyst. In this regard, it is disadvantageous to the light-off performance. However, the results showing a state opposite to the foregoing state were obtained, and it means that each of the catalyst A-1/B, the catalyst A-1/C, and the catalyst A-1/D has the excellent light-off performance.

Figure 3:
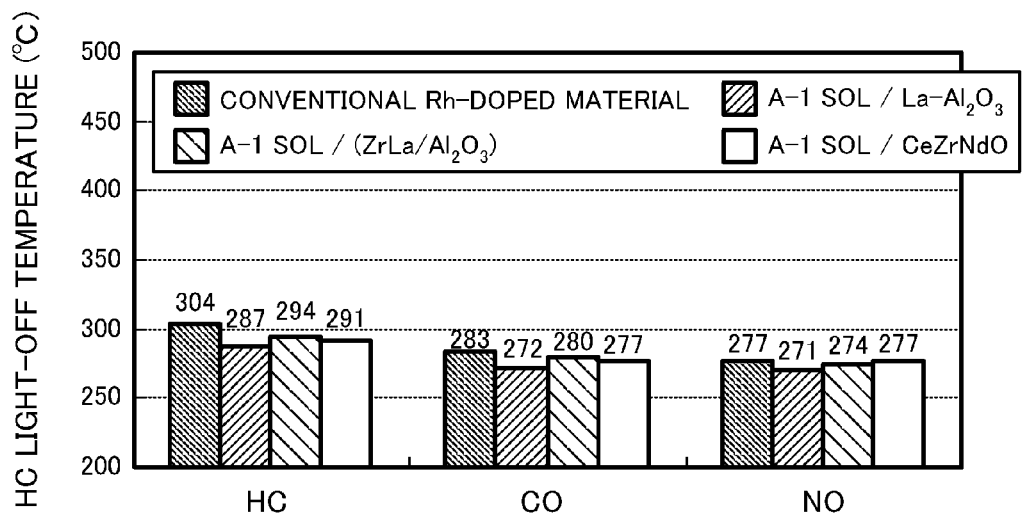
FIG. 3 is a graph illustrating a light-off temperature concerning purification of HC, CO, and NOx when a $CeO_2/(CeO_2+ZrO_2)$ mass ratio of the catalysts containing the particle component A-1 and the comparative catalyst is 25%.
Figure 4:
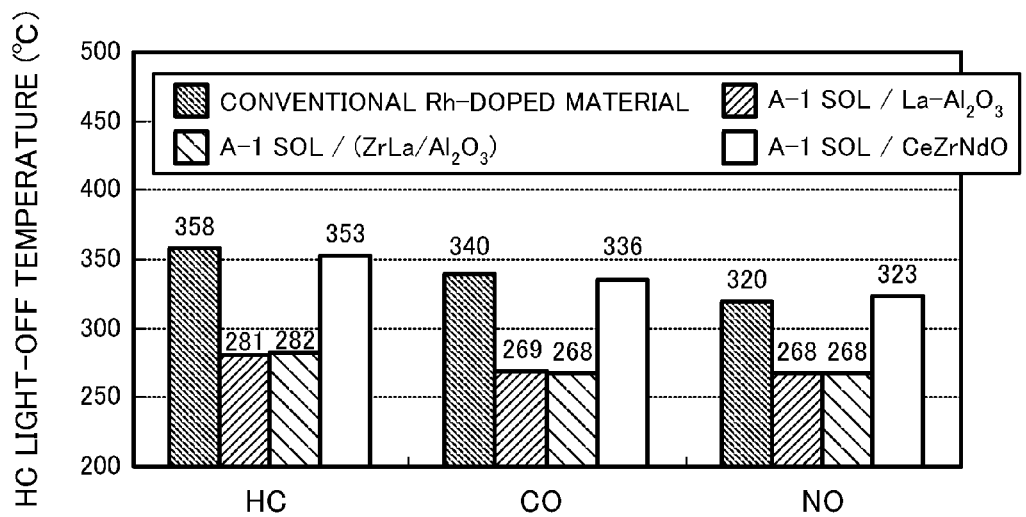
FIG. 4 is a graph illustrating the light-off temperature concerning the purification of HC, CO, and NOx when the $CeO_2/(CeO_2+ZrO_2)$ mass ratio is 50%.

FIG. 3 illustrates a light-off temperature concerning purification of HC, CO, and NOx of each of the catalysts when the $CeO_2/(CeO_2+ZrO_2)$ mass ratio is 25%, and FIG. 4 illustrates the light-off temperature concerning the purification of HC, CO, and NOx of each of the catalysts when the $CeO_2/(CeO_2+ZrO_2)$ mass ratio is 50%. Conditions for measurement of the light-off temperature are the same as those of the case of FIG. 2.

When the mass ratio is 25% (see FIG. 3), there is no large difference among the performance of the catalysts. However, when the mass ratio is 50% (see FIG. 4), the light-off performance concerning the purification of not only HC but also CO and NOx is not poor in the catalyst A-1/C (A-1 sol/CeZrNdO).

[Combination of Particle Component A-2 and Particle Component B, C, or D]

Next, a particle component A-2 (sol) having an Rh content of 0.6% by mass was employed instead of a particle component A-1 (sol) having an Rh content of 0.1% by mass. The exhaust gas purification performance was evaluated for the particle component A-2 combined with a particle component B, C, or D. A zirconyl nitrate binder was added to a catalyst A-2/B, a catalyst A-2/C, a catalyst A-2/D, and a catalyst A-2/(B+C+D) below so that each of the foregoing catalysts has the same mass as those of second to fifth comparative catalysts.

Preparation of Catalyst A-2/B

Six types of the particle component A-2 (sol) with different $CeO_2/(CeO_2+ZrO_2)$ mass ratios were employed instead of the particle component A-1 (sol), and six types of the catalyst A-2/B (A-2 sol/(ZrLa/$Al_2O_3$)) was obtained in the same manner as the preparation method of the catalyst A-1/B. Note that a supported amount of the particle component A-2 was set to 6.7 g/L so that an amount of supported Rh per a carrier capacity of 1 L is 0.04 g/L. A supported amount of the particle component B is 70 g/L. A binder amount is 8 g/L.

Preparation of Catalyst A-2/C

The six types of the particle component A-2 (sol) were employed instead of the particle component A-1 (sol), and six types of the catalyst A-2/C (A-2 sol/CeZrNdO) were obtained in the same manner as the preparation method of the catalyst A-1/C. Also in this case, a supported amount of the particle component A-2 is 6.7 g/L, and an Rh content in a catalytic layer is 0.04 g/L (=an amount of doped Rh in the particle component A-2). In addition, a supported amount of the particle component C is 70 g/L, and a binder amount is 8 g/L.

Preparation of Catalyst A-2/D

The six types of the particle component A-2 (sol) was employed instead of the particle component A-1 (sol), and six types of the catalyst A-2/D (A-2 sol/La—$Al_2O_3$) were obtained in the same manner as the preparation method of the catalyst A-1/D. Also in this case, a supported amount of the particle component A-2 is 6.7 g/L, and an Rh content in a catalytic layer is 0.04 g/L (=an amount of doped Rh in the particle component A-2). In addition, a supported amount of the particle component D is 70 g/L, and a binder amount is 8 g/L.

Preparation of Catalyst A-2/(B+C+D)

The catalyst A-2/(B+C+D) is a catalyst formed by combining the particle component A-2 and three types of components, i.e., the particle components B, C, and D. That is, the particle component A-2 (sol) having a $CeO_2/(CeO_2+ZrO_2)$ mass ratio of 50%, and the triple particle component mixture were used, and then the catalyst A-2/(B+C+D) was obtained in the same manner as the preparation method of the catalyst A-2/B. An amount of each supported component is 6.7 g/L for the particle component A-2, and 70 g/L in total of the triple particle component mixture of the particle components B, C, and D (a ratio (mass ratio) of the three particle components is 1:1:1). An Rh content in a catalytic layer is 0.04 g/L (=an amount of doped Rh in the particle component A-2), and a binder amount is 8 g/L.

Second Comparative Catalyst

In a second comparative catalyst, the conventional Rh-doped material having the large peak particle size was employed instead of a particle component A-2 having a small peak particle size. In addition, as a particle component B, Zr-based-oxide-supported alumina powder (ZrLa/$Al_2O_3$) was employed as in the catalyst A-2/B.

That is, the followings were mixed with ion-exchanged water to produce slurry: the conventional Rh-doped material having a $CeO_2/(CeO_2+ZrO_2)$ mass ratio of 50%; the particle component B (ZrLa/$Al_2O_3$); and a zirconyl nitrate binder. The carrier was coated with the slurry, and the drying and calcining processes were performed. Then, the second comparative catalyst (the conventional Rh-doped material/(ZrLa/$Al_2O_3$)) were obtained. An amount of each supported component per a carrier capacity of 1 L is 6.7 g/L for the conventional Rh-doped material, 70 g/L for the particle component B, 8 g/L for a binder. An Rh content in a catalytic layer is 0.04 g/L (=an amount of doped Rh in the conventional Rh-doped material).

Third Comparative Catalyst

A third comparative catalyst (the conventional Rh-doped material/CeZrNdO) was obtained in the similar manner to the preparation method of the second comparative catalyst, except that catalytic-metal-undoped CeZr-based mixed oxide powder (CeZrNdO) was employed as a particle component C as in the catalyst A-2/C. An amount of each supported component per a carrier capacity of 1 L is 6.7 g/L for the conventional Rh-doped material, 70 g/L for the particle component C, and 8 g/L for a binder. An Rh content in a catalytic layer is 0.04 g/L (=an amount of doped Rh in the conventional Rh-doped material).

Fourth Comparative Catalyst

A fourth comparative catalyst (the conventional Rh-doped material/La—Al$_2$O$_3$) was obtained in the similar manner to the preparation method of the second comparative catalyst, except that activated alumina powder (La—Al$_2$O$_3$) was employed as a particle component D as in the catalyst A-2/D. An amount of each supported component per a carrier capacity of 1 L is 6.7 g/L for the conventional Rh-doped material, 70 g/L for the particle component D, and 8 g/L for a binder. An Rh content in a catalytic layer is 0.04 g/L (=an amount of doped Rh in the conventional Rh-doped material).

Fifth Comparative Catalyst

A fifth comparative catalyst (the conventional Rh-doped material/(B+C+D)) was obtained in the similar manner to the preparation method of the second comparative catalyst, except that the conventional Rh-doped material and a triple powder mixture of activated alumina powder (La—Al$_2$O$_3$), Zr-based-oxide-supported alumina powder (ZrLa/Al$_2$O$_3$), and catalytic-metal-undoped CeZr-based mixed oxide powder (CeZrNdO) were combined. An amount of each supported component per a carrier capacity of 1 L is 6.7 g/L for the conventional Rh-doped material, 70 g/L in total of the triple particle component mixture of the particle components B, C, and D (a ratio (mass ratio) of the three particle components is 1:1:1), and 8 g/L for a binder. An Rh content in a catalytic layer is 0.04 g/L (=an amount of doped Rh in the conventional Rh-doped material).

[Exhaust Gas Purification Performance]

Figure 5:
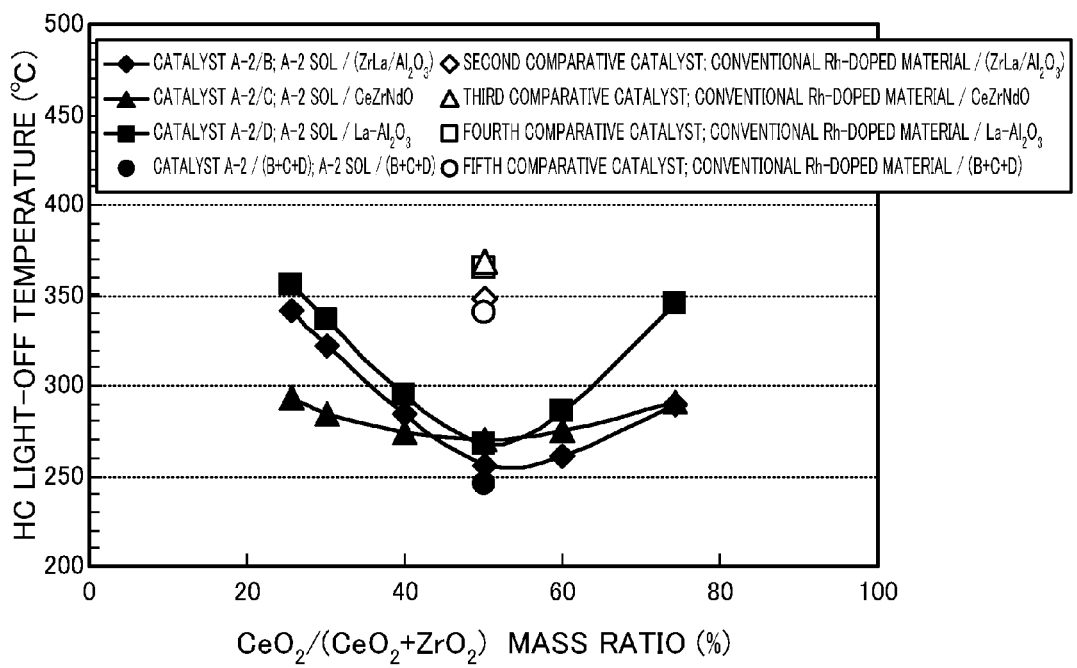
FIG. 5 is a graph illustrating the light-off temperature concerning the HC purification by the catalysts containing the particle component A-1 and the comparative catalyst.

For each of the catalysts A-2/B, A-2/C, A-2/D, and A-2/(B+C+D) and the second to fifth comparative catalysts, a light-off temperature concerning HC purification was measured under the same conditions as those of the case of FIG. 2. Results are shown in FIG. 5.

When the CeO$_2$/(CeO$_2$+ZrO$_2$) mass ratio is 50%, each of the catalysts A-2/B, A-2/C, A-2/D, and A-2/(B+C+D) has the light-off temperature lower than those of the second to fifth comparative catalysts having the same mass ratio. This is because of the following reasons: the particle component A-2 (Rh-doped material having the small peak particle size) has excellent oxygen storing/releasing performance as compared to that of the conventional Rh-doped material having the large peak particle size; wide and uniform dispersion of the particle component A-2 having a small particle size in the catalytic layer, and high dispersibility of a part of particles of the particle component A-2 adhered to the particle component B, C, or D having a large particle size result in that the particle component A-2 is likely to contact exhaust gas; and sintering is not likely to occur.

The catalyst A-2/C is noteworthy. That is, when the particle component A-1 having the Rh content of 0.1% by mass, which has been described above is combined with the catalytic-metal-undoped CeZr-based mixed oxide powder (CeZrNdO) (i.e., in the catalyst A-1/C), the light-off performance is not good. On the other hand, in a case illustrated in FIG. 5, where the Rh content is 0.6% by mass (i.e., in the catalyst A-2/C), the results show the excellent light-off performance as in each of the catalysts A-2/B and A-2/D.

Next, regarding an influence of a difference in the CeO$_2$/(CeO$_2$+ZrO$_2$) mass ratio on catalytic performance, the light-off temperature is the lowest when the CeO$_2$/(CeO$_2$+ZrO$_2$) mass ratio is 50%, and the good exhaust gas purification performance can be obtained when the mass ratio is equal to or greater than 30% and equal to or less than 75%, and, in particular, equal to or greater than 40% and equal to less than 60%.

Figure 6:
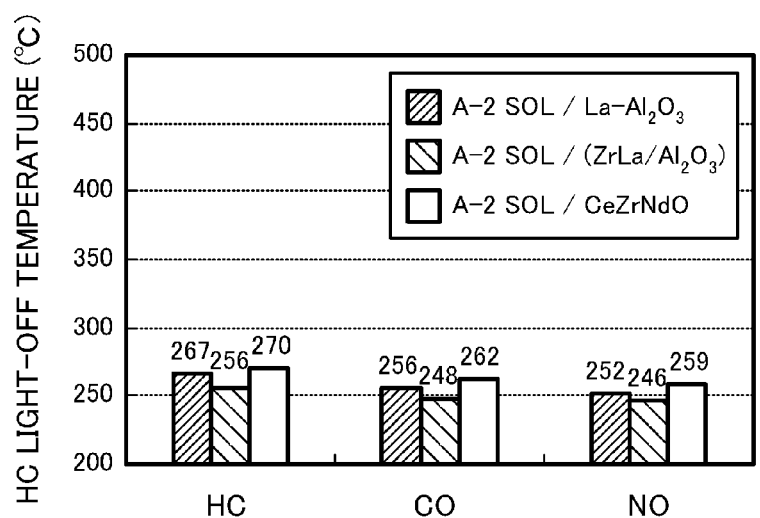
FIG. 6 is a graph illustrating the light-off temperature concerning the purification of HC, CO, and NOx when a $CeO_2/(CeO_2+ZrO_2)$ mass ratio of a catalyst containing a particle component A-2.

FIG. 6 illustrates a light-off temperature concerning purification of HC, CO, and NOx by each of the catalysts A-2/B, A-2/C, and A-2/D when the CeO$_2$/(CeO$_2$+ZrO$_2$) mass ratio is 50%. Conditions for measurement of the light-off temperature are the same as those of the case of FIG. 2. As will be seen from FIG. 6, the foregoing catalysts have the excellent light-off performance concerning the purification of not only HC but also CO and NOx.

EXAMPLES AND COMPARATIVE EXAMPLES OF THE PRESENT DISCLOSURE

Next, exhaust gas purification catalysts of examples and comparative examples, which are configured based on findings concerning the effect of the foregoing combinations of the particle components will be described.

First Example

In the present example, an exhaust gas purification catalyst is formed by combining a catalytic component A-1/B and a catalytic component A-2/C.

That is, the followings were mixed together at the same mass ratio as that of the catalyst A-1/B (the particle component A-1 of 40 g and the particle component B of 70 g): sol of a particle component A-1 (Rh-doped material having an Rh content of 0.1% by mass and having a small peak particle size) having a CeO$_2$/(CeO$_2$+ZrO$_2$) mass ratio of 50%; and a particle component B (Zr-based-oxide-supported alumina powder (ZrLa/Al$_2$O$_3$)). Moisture of the resultant mixture was evaporated, and the mixture was crushed. Then, the catalytic component A-1/B was obtained. A part of particles of the particle component A-1 was supported on the particle component B, and the remaining particles of the particle component A-1 were in a powder form without being supported on the particle component B.

In a similar manner, the followings were mixed together at the same mass ratio as that of the catalyst A-2/C (the particle component A-2 of 6.7 g and the particle component C of 70 g): sol of a particle component A-2 (Rh-doped material having an Rh content of 0.6% by mass and having a small peak particle size) having a CeO$_2$/(CeO$_2$+ZrO$_2$) mass ratio of 50%; and a particle component C (catalytic-metal-undoped CeZr-based mixed oxide powder (CeZrNdO)). Moisture of the resultant mixture was evaporated, and the mixture was crushed. Then, the catalytic component A-2/C was obtained. This brings about a state in which most of particles of the particle component A-2 are supported on the particle component C.

The catalytic component A-1/B and the catalytic component A-2/C were mixed with ion-exchanged water to produce slurry. The carrier was coated with the slurry, and the drying and calcining processes were performed. Then, the exhaust gas purification catalyst of the first example was obtained. An amount of each supported component per a carrier capacity of 1 L is 20 g/L for the particle component A-1, 35 g/L for the particle component B, 3.35 g/L for the particle component A-2, and 35 g/L for the particle component C. An Rh content in a catalytic layer is 0.04 g/L (=an amount of doped Rh in the particle component A-1 and the particle component A-2). In the first example, the particles of the particle component A-1, which are not supported on the particle component B, and the particles of the particle component A-2, which are not supported on the particle component C function as a binder in the catalytic layer.

First Comparative Example

The followings were mixed with ion-exchanged water to produce slurry: sol of a particle component A-1 having a $CeO_2/(CeO_2+ZrO_2)$ mass ratio of 50%; sol of a particle component A-2 having a $CeO_2/(CeO_2+ZrO_2)$ mass ratio of 50%; a particle component B; and a particle component C. The carrier was coated with the slurry, and the drying and calcining processes were performed. Then, an exhaust gas purification catalyst of a first comparative example was obtained. As in the first example, an amount of each supported component per a carrier capacity of 1 L is 20 g/L for the particle component A-1, 35 g/L for the particle component B, 3.35 g/L for the particle component A-2, and 35 g/L for the particle component C. An Rh content in a catalytic layer is 0.04 g/L (=an amount of doped Rh in the particle component A-1 and the particle component A-2).

Second Example

The followings were mixed together at a mass ratio at which a particle component A-1 is 6.7 g, a particle component A-2 is 1.12 g, and a particle component D is 23.4 g: sol of the particle component A-1 having a $CeO_2/(CeO_2+ZrO_2)$ mass ratio of 50%; sol of the particle component A-2 having a $CeO_2/(CeO_2+ZrO_2)$ mass ratio of 50%; and the particle component D. Moisture of the resultant mixture was evaporated, and the mixture was crushed. Then, a catalytic component (A-1, A-2)/D was obtained. The catalytic component A-1/B, the catalytic component A-2/C, and the catalytic component (A-1, A-2)/D were mixed with ion-exchanged water to produce slurry. The carrier was coated with the slurry, and the drying and calcining processes were performed. Then, an exhaust gas purification catalyst of a second example was obtained.

An amount of each supported component per a carrier capacity of 1 L is 20 g/L for the particle component A-1, 3.35 g/L for the particle component A-2, 23.3 g/L for the particle component B, 23.3 g/L for the particle component C, and 23.4 g/L for the particle component D. An Rh content in a catalytic layer is 0.04 g/L (=an amount of doped Rh in the particle component A-1 and the particle component A-2). In the particle component A-1 of 20 g/L, an amount of the particle component A-1 contained in the catalytic component A-1/B is 13.3 g/L, and an amount of the particle component A-1 contained in the catalytic component (A-1, A-2)/D is 6.7 g/L. In the particle component A-2 of 3.35 g/L, an amount of the particle component A-2 contained in the catalytic component A-2/C is 2.23 g/L, and an amount of the particle component A-2 contained in the catalytic component (A-1, A-2)/D is 1.12 g/L.

In the second example, particles of the particle component A-1, which are not supported on, e.g., the particle component B, and particles of the particle component A-2, which are not supported on, e.g., the particle component C also function as a binder in the catalytic layer.

Second Comparative Example

The followings were mixed with ion-exchanged water to produce slurry: sol of a particle component A-1 having a $CeO_2/(CeO_2+ZrO_2)$ mass ratio of 50%; sol of a particle component A-2 having a $CeO_2/(CeO_2+ZrO_2)$ mass ratio of 50%; a particle component B; a particle component C; and a particle component D. The carrier was coated with the slurry, and the drying and calcining processes were performed. Then, an exhaust gas purification catalyst of a second comparative example was obtained. As in the second example, an amount of each supported component per a carrier capacity of 1 L is 20 g/L for the particle component A-1, 3.35 g/L for the particle component A-2, 23.3 g/L for the particle component B, 23.3 g/L for the particle component C, and 23.4 g/L for the particle component D. An Rh content in a catalytic layer is 0.04 g/L (=an amount of doped Rh in the particle component A-1 and the particle component A-2).

[Exhaust Gas Purification Performance]

For each of the catalysts of the first and second examples and the first and second comparative examples, a light-off temperature concerning purification of HC, CO, NOx was measured under the same conditions as those of the case of FIG. 2. Results are shown in Table 2.

TABLE 2

| | | Light-Off Temperature (° C.) | | |
|---|---|---|---|---|
| | | HC | CO | NO |
| First Example | (A-1/B) + (A-2/C) | 275 | 262 | 255 |
| First Comparative Example | (A-1) + (A-2) + (B) + (C) | 287 | 273 | 265 |
| Second Example | (A-1/B) + (A-2/C) + ((A-1, A-2)/D) | 270 | 261 | 257 |
| Second Comparative Example | (A-1) + (A-2) + (B) + (C) + (D) | 283 | 276 | 271 |

As will be seen from the comparison between the first example and the first comparative example and the comparison between the second example and the second comparative example, the light-off performance of the catalyst is enhanced not in a configuration in which the particle component A-1, the particle component A-2, the particle component B, and the particle component C are merely mixed together, but in a configuration in which the particle component A-1 is supported on the particle component B, and the particle component A-2 is supported on the particle component C (the catalytic component A-1/B+the catalytic component A-2/C). In addition, as will be seen from the comparison between the first and second examples, the light-off performance is further improved when a part of the particles of the particle component A-1 and a part of the particles of the particle component A-2 are supported on the particle component D.

As will be clearly seen from FIGS. 2-6, when comparing the particle component A-1 having an Rh content of 0.1% by mass with the particle component A-2 having an Rh content of 0.6% by mass, if an amount of supported Rh is the same among the catalysts, a case where the particle component A-2 having the higher Rh content is used is more advantageous to improvement of the exhaust gas purification performance. However, since the Rh content of the particle component A-2 is high, an amount of the supported particle component A-2 of the catalyst is decreased if only the particle component A-2 is used as the particle component A. For example, when an amount of supported Rh of the catalyst is 0.04 g/L, the amount of the supported particle component A-2 is 6.7 g/L as described above. Thus, if the particle component A-2 is supported on the particle component B, C, or D, an amount of the particle component A-2 which can be used as the binder is significantly decreased.

On the other hand, since the particle component A-1 has the lower Rh content, an amount of the supported particle component A-1 in the catalyst is increased. That is, even when the particle component A-1 is supported on the particle component B, C, or D, surplus particles of the particle component A-1, which are not supported on, e.g., the particle component B can be obtained, and such particles can be used as the binder. This is one of advantages of using the particle components A-1 and A-2 with the different Rh contents in the present disclosure.

When the particle component A-1 is supported on the particle component C, the surplus particles of the particle component A-1 can be used as the binder. However, as will be seen from FIGS. 2 and 4, such a state is disadvantageous to the exhaust gas purification performance. Thus, the particle component A-2 having the higher Rh content, which is advantageous to the improvement of the exhaust gas purification performance is supported on the particle component C, and the particle component A-1 is supported on the particle component B.

The employment of the foregoing configuration allows enhancement of the exhaust gas purification performance of the catalyst while using a part of the particles of the particle component A as the binder.

Note that the catalytic layer may contain the catalytic component A-2/B in which the particle component A-2 is supported on the particle component B.

What is claimed is:

1. An exhaust gas purification catalyst, comprising:
a catalytic layer containing a particle component A composed of catalytic-metal-doped CeZr-based mixed oxide powder in which catalytic metal is solid-dissolved in CeZr-based mixed oxide, a particle component B composed of Zr-based-oxide-supported alumina powder in which Zr-based oxide is supported on activated alumina particles, and a particle component C composed of CeZr-based mixed oxide powder in which catalytic metal is not solid-dissolved,
wherein the particle component A includes a particle component A-1 and a particle component A-2 which have different contents of catalytic metal in the catalytic-metal-doped CeZr-based mixed oxide, at least a part of the particle component A-1 is supported on the particle component B, and at least a part of the particle component A-2 is supported on the particle component C, and
the content of catalytic metal is lower in the particle component A-1 than the particle component A-2.

2. The exhaust gas purification catalyst of claim 1, wherein the catalytic layer further contains a particle component D composed of activated alumina powder containing La, and
at least a part of the particle component A-1 and/or at least a part of the particle component A-2 is supported on the particle component D.

3. The exhaust gas purification catalyst of claim 1, wherein both of the particle component A-1 and the particle component A-2 have a $CeO_2$ proportion which is equal to or greater than 30% by mass and equal to or less than 75% by mass in a total amount of $CeO_2$ and $ZrO_2$.

4. The exhaust gas purification catalyst of claim 2, wherein both of the particle component A-1 and the particle component A-2 have a $CeO_2$ proportion which is equal to or greater than 30% by mass and equal to or less than 75% by mass in a total amount of $CeO_2$ and $ZrO_2$.

5. The exhaust gas purification catalyst of claim 3, wherein both of the particle component A-1 and the particle component A-2 have a $CeO_2$ proportion which is equal to or greater than 40% by mass and equal to or less than 60% by mass in a total amount of $CeO_2$ and $ZrO_2$.

6. The exhaust gas purification catalyst of claim 4, wherein both of the particle component A-1 and the particle component A-2 have a $CeO_2$ proportion which is equal to or greater than 40% by mass and equal to or less than 60% by mass in a total amount of $CeO_2$ and $ZrO_2$.

7. The exhaust gas purification catalyst of claim 1, wherein only the catalytic metal solid-dissolved in the CeZr-based mixed oxide of the particle component A is contained in the catalytic layer as catalytic metal.

8. The exhaust gas purification catalyst of claim 2, wherein only the catalytic metal solid-dissolved in the CeZr-based mixed oxide of the particle component A is contained in the catalytic layer as catalytic metal.

9. The exhaust gas purification catalyst of claim 3, wherein only the catalytic metal solid-dissolved in the CeZr-based mixed oxide of the particle component A is contained in the catalytic layer as catalytic metal.

10. The exhaust gas purification catalyst of claim 4, wherein
only the catalytic metal solid-dissolved in the CeZr-based mixed oxide of the particle component A is contained in the catalytic layer as catalytic metal.

11. The exhaust gas purification catalyst of claim 5, wherein
only the catalytic metal solid-dissolved in the CeZr-based mixed oxide of the particle component A is contained in the catalytic layer as catalytic metal.

12. The exhaust gas purification catalyst of claim 1, wherein
the particle component A is contained in the catalytic layer as a binder.

13. The exhaust gas purification catalyst of claim 2, wherein
the particle component A is contained in the catalytic layer as a binder.

14. The exhaust gas purification catalyst of claim 3, wherein
the particle component A is contained in the catalytic layer as a binder.

15. The exhaust gas purification catalyst of claim 1, wherein
the particle component A-1 and the particle component A-2 have a particle size distribution with a peak in a particle size range which is equal to or greater than 100 nm and equal to or less than 300 nm, a number-average particle size of the particle component B is equal to or greater than 10 µm and equal to or less than 50 µm, and a number-average particle size of the particle component C is equal to or greater than 0.5 µm and equal to or less than 5.0 µm.

* * * * *